US011138731B2

United States Patent
Katzmann et al.

(10) Patent No.: US 11,138,731 B2
(45) Date of Patent: Oct. 5, 2021

(54) METHODS FOR GENERATING SYNTHETIC TRAINING DATA AND FOR TRAINING DEEP LEARNING ALGORITHMS FOR TUMOR LESION CHARACTERIZATION, METHOD AND SYSTEM FOR TUMOR LESION CHARACTERIZATION, COMPUTER PROGRAM AND ELECTRONICALLY READABLE STORAGE MEDIUM

(71) Applicant: Siemens Healthcare GmbH, Erlangen (DE)

(72) Inventors: Alexander Katzmann, Langensendelbach (DE); Lisa Kratzke, Erlangen (DE); Alexander Muehlberg, Nuremberg (DE); Michael Suehling, Erlangen (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 163 days.

(21) Appl. No.: 16/417,754

(22) Filed: May 21, 2019

(65) Prior Publication Data
US 2019/0370969 A1    Dec. 5, 2019

(30) Foreign Application Priority Data

May 30, 2018  (EP) .................................. 18175136
Nov. 2, 2018  (EP) .................................. 18204072

(51) Int. Cl.
*G06T 7/00*    (2017.01)

(52) U.S. Cl.
CPC .. *G06T 7/0014* (2013.01); *G06T 2207/20081* (2013.01); *G06T 2207/20084* (2013.01); *G06T 2207/30096* (2013.01)

(58) Field of Classification Search
CPC .... G06N 3/0454; G06N 3/084; G06N 3/0472; G06T 2207/20081; G06T 2207/20084; G06T 2207/30096; G06T 7/0014
See application file for complete search history.

(56) References Cited

U.S. PATENT DOCUMENTS

2018/0247201 A1* 8/2018 Liu .................... G06N 3/088
2018/0349758 A1* 12/2018 Pan .................... G06N 3/0454
2019/0080205 A1* 3/2019 Kaufhold ............. G06K 9/6257
(Continued)

OTHER PUBLICATIONS

Frid-Adar, Maayan et al. "Synthetic Data Augmentation using GAN for Improved Liver Lesion Classification" arxiv,org; To be presented at IEEE International Symposium on Biomedical Imaging (ISBI), 2018 // arXiv: 1801.02385 ics.CVI (Year: 2018).*
(Continued)

*Primary Examiner* — Brandon J Miller
(74) *Attorney, Agent, or Firm* — Harness, Dickey & Pierce, P.L.C.

(57) ABSTRACT

A method is for generating synthetic training data and for training deep learning algorithms for tumor lesion characterization. In an embodiment, the method for generating synthetic training data for training a deep learning algorithm includes training a Generative Adversarial Network to generate synthetic image data, the Generative Adversarial Network including a generator and a discriminator; and using the generator of the Generative Adversarial Network to generate synthetic image data as the synthetic training data.

38 Claims, 4 Drawing Sheets

(56) References Cited

U.S. PATENT DOCUMENTS

| | | | |
|---|---|---|---|
| 2019/0114767 A1 | 4/2019 | Muehlberg et al. | |
| 2019/0139641 A1* | 5/2019 | Itu | G06N 3/0427 |
| 2019/0166141 A1* | 5/2019 | Xu | G06N 20/00 |
| 2020/0220098 A1* | 7/2020 | Tsai | H01L 27/3258 |

OTHER PUBLICATIONS

Springenberg, Jost Tobias et al. "Striving for Simplicity: The All Convolutional Net" ICLR-2015, University of Freiburg; arXiv:1412.6806v3 [cs.LG].
Simonyan, Karen et al. "Deep Inside Convolutional Networks: Visualising Image Classification Models and Saliency Maps" arXiv:1312.6034v2 (Dec. 20, 2013).
Aerts, Hugo et al.: "Decoding tumour phenotype by noninvasive imaging using a quantitative radiomics approach"; in: Nature Communications; vol. 5; 2014; DOI: 10.1036/ncomms5006.
Goodfellow, Ian J. et al. "Generative Adversarial Nets", Departement d'informatique et de recherche operationnelle, Universite' de MontrealMontreal, QC H3C 3J7.
Gillies, Robert J. et al.: "Radiomics: Images Are More than Pictures, They Are Data"; in: Radiology; vol. 278; No. 2; pp. 563-577; 2016.
Kyukwang, Kim et al. "Autoencoder-Combined Generative Adversarial Networks for Synthetic Image Data Generation and Detection of Jellyfish Swarm" IEEE Access, vol. 6; pp. 54207-54214, Sep. 24, 2018 // DOI: 10.1109/ACCESS.2018.2872025.
Ren, Mengye et al. "Learning to Reweight Examples for Robust Deep Learning" Published at ICML 2018 // arXiv:1803.09050 (cs.LG).
Xu, Jun et al. "Stacked Sparse Autoencoder (SSAE) for Nuclei Detection on Breast Cancer Histopathology Images" IEEE Transactions on Medical Imaging, vol. 35, No. 1, pp. 119-130, Jan. 2016 // first published on Jul. 20, 2015 // DOI: 10.1109/TMI.2015.2458702.
Guo, Yanrong et al. "Deformable MR Prostate Segmentation via Deep Feature Learning and Sparse Patch Matching" IEEE Transactions on Medical Imaging, vol. 35, No. 4, pp. 1077-1089, Apr. 2016 // first published on Dec. 11, 2015 // DOI: 10.1109/TMI.2015.2508280.
Frid-Adar, Maayan et al. "Synthetic Data Augmentation using GAN for Improved Liver Lesion Classification" arxiv,org; To be presented at IEEE International Symposium on Biomedical Imaging (ISBI), 2018 // arXiv:1801.02385 [cs.CV].
Extended European Search Report dated Jun. 13, 2019.
Goodfellow I. J. et. al., "Maxout Networks", ICML, 2013.
Graham B., "Fractional Max-Pooling", arxiv:cs/arXiv:1412.6071, 2015.
Stollenga M. F. et. al., "Deep Networks with Internal Selective Attention through Feedback Connections", NIPS, 2014.
Perronnin F. et. al., "Improving the Fisher kernel for large-scale image classification", ECCV, 2010.
Srivastava N. et. al., "Discriminative Transfer Learning with Tree-based Priors", NIPS, 2013.
Simonyan K. et. al., "Deep Fisher networks and class saliency maps for object classification and localisation", ILSVRC workshop, 2013.
Gulcehre C. et. al., "Learned-Norm Pooling for Deep Feedforward and Recurrent Neural Networks", ECML, 2014.
Lin M. et. al., "Network in Network", ICLR: Conference Track, 2014.
Wan L. et. al., "Regularization of Neural Networks using DropConnect", International Conference on Machine Learning (ICML), 2013.
Simonyan, Karen, and Zisserman, Andrew "Very Deep Convolutional Networks for Large-Scale Image Recognition" https://arxiv.org/abs/1409.1556v6 (2014); 2014.
Srivastava R. K. et. al., "Compete to Compute", NIPS, 2013.
Bruna J. et. al., "Signal recovery from Pooling Representations", ICML, 2014.
Zeiler M. D. et. al., "Stochastic Pooling for Regularization of Deep Convolutional Neural Networks", ICLR, 2013.
Krizhevsky A. et al, "ImageNet Classification with Deep Convolutional Neural Networks", Advances in Neural Information Processing Systems 25, 2012, pp. 1106-1114; 2012.
Boykov Y. et. al., "Interactive Graph Cuts for Optimal Boundary & Region Segmentation of Objects in N-D Images", Proceedings of Internation Conference on Computer Vision, Vancouver, Canada, Jul. 2001 vol. I, pp. 105-112; 2001.
Jarrett et al.: "What is the Best Multi-Stage Architecture for Object Recognition?"; in International Conference on Computer Vision (ICCV); pp. 2146-2153; 2009.
Zeiler M. D. et. al., "Visualizing and Understanding Convolutional Networks", CoRR, Nov. 2013.
Baehrens D. et. al., "How to Explain Individual Classification Decisions", Journal of Machine Learning Research 11, pp. 1803-1831, 2010.
Ciresan D. C. et. al., "High-Performance Neural Networks for Visual Object Classification", rxiv:cs/arXiv:1102.0183, 2011.
Lee C. et. al., "Deeply-Supervised Nets", Deep Learning and Representation Learning Workshop, NIPS, 2014.
Krizhevsky A., "Learning Multiple Layers of Features from Tiny Images", 2009.
Szegedy C. et. al., "Going deeper with convolutions", CoRR abs/1409.4842. URL http://arxiv.org/abs/1409.4842.; 2014.
Hinton G. E. et. al., "Improving neural networks by preventing co-adaptation of feature detectors", arxiv:cs/1207.0580v3, 2012.
Le Q. et. al., "Building high-level features using large scale unsupervised learning", ICML, 2012.
Jia Y. et. al., "Beyond Spatial Pyramids: Receptive Field Learning for Pooled Image Features", CVPR, 2012.
Springenberg J. T. et. al., "Improving Deep Neural Networks with Probabilistic Maxout Units", arXiv:1312.6116, ICLR: Workshop Track, 2013.
Behnke S. et. al., "Hierarchical Neural Networks for Image Interpretation", PhD thesis, 2003.
Hinton G. E. et. al., "A fast learning algorithm for deep belief nets", Neural Computation, 18:1527-1554, 2006.
Ciresan, et al.; "Multi-column deep neural networks for image classification;" Computer Vision and Pattern Recognition (CVPR), 2012 IEEE Conference on. IEEE, 2012.
Felzenszwalb P. et. al., "A discriminatively trained, multiscale, deformable part model", CVPR, 2008.
Deng J. et. al., "Imagenet: A large-scale hierarchical image database", Computer Vision and Pattern Recognition, Conference on. IEEE, 2009.
Berg A. et. al., "Large scale visual recognition challenge 2010", LSVRC, 2010.
Lecun, Yann et al.; "Gradient-Based Learning Applied to Document Recognition" Proceedings of the IEEE, vol. 86, No. 11, pp. 2278-2324, Nov. 1998; DOI: 10.1109/5.726791; 1998.
Srivastava, Nitish et al., "Dropout: A Simple Way to Prevent Neural Networks from Overfitting", Journal of Machine Learning Research, 15, (2014), 1929-1958.; 2014.
Erhan D. et. al.; "Visualizing Higher-Layer Features of a Deep Network", Technical Report 1341, University of Montreal, 2009.
Jia Y. et. al., "Caffe: Convolutional architecture for fast feature embedding", In Proceedings of the 22nd ACM international conference on Multimedia (pp. 675-678). ACM.; 2014.
Simonyan, Karen, Vedaldi, Andrea, and Zisserman, Andrew, Deep inside convolutional networks: Visualising image classification models and saliency maps. In 1312.6034, also appeared at ICLR Workshop 2014, 2014. URL http://arxiv.org/abs/1312.6034.
Office Action for European Patent Application No. 18204072.5 dated Apr. 22, 2021.

* cited by examiner

METHODS FOR GENERATING SYNTHETIC TRAINING DATA AND FOR TRAINING DEEP LEARNING ALGORITHMS FOR TUMOR LESION CHARACTERIZATION, METHOD AND SYSTEM FOR TUMOR LESION CHARACTERIZATION, COMPUTER PROGRAM AND ELECTRONICALLY READABLE STORAGE MEDIUM

PRIORITY STATEMENT

The present application hereby claims priority under 35 U.S.C. § 119 to European patent application numbers EP 18175136.3 filed May 30, 2018 and EP 18204072.5 filed Nov. 2, 2018, the entire contents of each of which are hereby incorporated herein by reference.

FIELD

Embodiments of the invention generally relate to a method and system for tumor biology visualization and assessment, in particular for characterization and/or tumor biology visualization and assessment of colorectal cancer, and/or for lung nodule characterization. Embodiments of the invention generally relate to a method and system for lung nodule characterization and/or tumor lesion characterization and/or tumor biology visualization and assessment via machine learning, in particular deep learning. Embodiments of the invention further generally relate to a computer program and an electronically readable storage medium.

Embodiments of the invention are generally in the field of medical imaging and medical image analysis. Medical imaging can be performed with a variety of imaging modalities such as X-ray, ultra sound, magnetic resonance imaging (MRI), computed tomography (CT), PET, SPECT etc. as are known in the art. The imaging is performed with a respective imaging device, also referred to as "scanner".

BACKGROUND

Lung nodules are found in about one in a hundred chest CT scans worldwide. Overall, approximately 150,000 lung nodules per year are found in the US only. Most of these nodules are granulomas (inflamed tissue) or hamartomas (benign tumors) that are not explicitly life threatening. Hence, the classification of lung lesion's malignancy is a crucial task in radiology that can guide the differential diagnosis and lead to a patient-tailored treatment decision. When lung cancer is misdiagnosed, the patient may receive improper treatment, treatment too late, or no treatment at all, resulting in significantly lower survival chances. (Semi-) Automatic classification of tumor malignancy could on one hand help to improve patient survival rate and on the other hand reduce costs of public health services. With the recent introduction of coverage and reimbursement for lung cancer screening using low dose CT scanning in the US, the need and potential for computer-assisted decision support for lung nodule characterization increased dramatically.

Colorectal cancer is the second leading cause of cancer related deaths in modern societies, being responsible for more than 50,000 deaths in the U.S. in 2017 alone. More than 50% of patients with colorectal cancer develop liver metastases, which may lead to liver organ failure, additional organ compression and thus significantly reduce patient life time.

In colorectal cancer treatment a patient is scanned with computed tomography (CT) every 2-3 months (depending on tumor stage), to rule out liver and/or lung metastases, being the most common sites for CRC. Such metastases are correlated with significantly reduced patient survival (non-metastatic: 53-92%, depending on stage; metastatic: 11%). Current assessment of liver lesions is done using the Response Evaluation Criterion for Solid Tumors (RECIST). When liver lesions are found, using RECIST, lesion therapy response is assessed by measuring the longest lesion diameter within one tumor slice. After another 2-3 months the lesion is reassessed with the same measurement. By taking the ratio of both measurements, the lesion response is deduced. Taking RECIST's criteria, a shrinkage of at least 30% indicates a partial therapy response (PR), while at least 20% growth implies a progressive disease (PD). Neither significant growth nor shrinkage are classified as a stable disease (SD). Applying these criteria has one major downside, as it is only applicable retrospectively. Thus, when patients have neither PD- nor PR-status, their medication cannot be adapted as RECIST does not allow direct conclusions on future tumor growth.

As already discussed, characterizing nodules found in CT (Computed Tomography) chest images or tumor lesions found in CT images in general is mainly guided by the radiologist's experience, who uses visual criteria such as spiculation, lobulation or sphericity. Termed "Radiomics", some of these criteria can be described partially by automatically extractable, but hand-crafted, image features whose relation to the quality of nodule characterization remains speculative. Concerning "Radiomics", please also refer to the following articles:

Aerts, H., et al. (2014). Decoding tumor phenotype by noninvasive imaging using a quantitative radiomics approach. Nature communications, 5, 4006.

Gillies, R. J., Kinahan, P. E., and Hricak, H. (2015). Radiomics: images are more than pictures, they are data. Radiology, 278(2), 563-577.

A more general, automatic way to represent visual lesion variation would neglect the necessity for feature crafting by hand, where there is no guarantee for hand-crafted features to be suitable for the final classification task. For most domains, current image classification algorithms mainly employ deep convolutional neural networks (DCNNs/Deep Learning) where the identification of appropriate image features is inherently done in the DCNN training process. Since medical data is often rare and not publicly available—due to privacy concerns or ethical embodiments, while DCNNs contain a large number of free parameters, they usually do not reach the quality of more classical conservative approaches, e.g. random forests, when the amount of available data is very limited.

SUMMARY

At least one embodiment of the invention addresses at least one of these limitations due to limited data availability, in particular to provide a device/method for high quality tumor lesion characterization despite limited data availability.

At least one embodiment of the invention is achieved by providing methods, systems, computer programs and electronically readable storage mediums according to the independent claims. Preferred embodiments are described in the dependent claims.

In particular, embodiments of the invention relate to the methods for training artificial intelligence algorithms and/or methods and systems to perform tumor lesion characterization, in particular for lung nodule characterization or for characterization and/or tumor biology visualization and assessment of colorectal cancer. The invention further relates to the methods as generally described herein for generating synthetic training data for training such artificial intelligence algorithms and/or systems to perform tumor lesion characterization. Embodiments of the further relate to the methods as generally described herein for tumor lesion characterization. Embodiments of the invention further relates to a system as generally described herein for tumor lesion characterization. Embodiments of the invention further relate to any computer program which performs the steps of the methods of an embodiment of the invention, if the computer program is executed on an computer, and to any electronically readable storage medium, on which any of the computer programs of an embodiment of the invention can be stored.

Specifically, in a first embodiment, the invention relates to a method to generate synthetic training data for training a deep learning algorithm, comprising training a Generative Adversarial Network (GAN) to generate synthetic image data, wherein the GAN comprises a generator and a discriminator, and using the generator of the GAN to generate synthetic image data as the synthetic training data.

In a second embodiment, the invention also concerns a method for training a deep learning algorithm to perform a tumor lesion characterization, in particular a lung nodule characterization or for characterization and/or tumor biology visualization and assessment of colorectal cancer, on image data of a region of the anatomy of a subject patient, comprising the step of training the deep learning algorithm with training data comprising synthetic image data. In particular, the synthetic image data as training data was generated in a method according to the first embodiment of the invention. Preferably, the training data also comprises image data obtained from patient image data. In this manner, a small amount of available training data in the form of acquired image data can be enriched/augmented by realistic synthetic data, resulting in a better training and higher quality of output information.

In a third embodiment, the invention relates to a method for tumor lesion characterization, in particular for lung nodule characterization or for characterization and/or tumor biology visualization and assessment of colorectal cancer, comprising the steps of:
  receiving subject patient image data of a region of the anatomy of subject patient,
  analysing the subject patient image data using a trained deep learning algorithm,
  determining an output information regarding a tumor lesion based on the step of analysing,
  wherein the trained deep learning algorithm has been trained with training data comprising synthetic image data in accordance with a method according to the second embodiment of the invention.

The invention, in the third embodiment, further may relate to a system for tumor lesion characterization, comprising
  an interface to receive subject patient image data of a region of the anatomy of subject patient,
  an analysing unit for analysing the subject patient image data using a trained deep learning algorithm, wherein the trained deep learning algorithm has been trained with training data comprising synthetic image data in accordance with any of the methods according to the second embodiment of the invention,
  a determining unit for determining an output information regarding a tumor lesion based on the step of analysing,
  an interface for outputting the determined output information.

The system may be implemented on a computer, a workstation, in a network of computers or the like. It can be provided as part of an imaging scanner and can be integrated into the scanner's control system. It can also be implemented in a cloud-based solution.

BRIEF DESCRIPTION OF THE DRAWINGS

Further details and advantages of the current invention can be taken from the following description of preferred embodiments in conjunction with the drawings, in which.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes;

etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

Specifically, in a first embodiment, the invention relates to a method to generate synthetic training data for training a deep learning algorithm, comprising
training a Generative Adversarial Network (GAN) to generate synthetic image data, wherein the GAN comprises a generator and a discriminator, and
using the generator of the GAN to generate synthetic image data as the synthetic training data.

Generative adversarial networks (GANs) are a class of artificial intelligence algorithms used in unsupervised machine learning, implemented by a system of two neural networks contesting with each other in a zero-sum game framework. (Please refer to the article by Goodfellow et al. (2014). Generative Adversarial Networks. In: Advances in neural information processing systems (pp. 2672-2680)), the entire contents of which are incorporated herein by reference. This technique can generate images that look at least superficially authentic to human observers, having many realistic characteristics. One network generates candidates and the other evaluates them.

Typically, the generative network learns to map from a latent space to a particular data distribution of interest, while the discriminative network discriminates between instances from the true data distribution and candidates produced by the generator. The generative network's training objective is to increase the error rate of the discriminative network (i.e., "fool" the discriminator network by producing novel synthesized in-stances that appear to have come from the true data distribution). In practice, a known dataset serves as the initial training data for the discriminator. Training the discriminator involves presenting it with samples from the dataset, until it reaches some level of accuracy. Thereafter, samples synthesized by the generator are evaluated by the discriminator.

Backpropagation can be applied in both networks so that the generator produces better images, while the discriminator becomes more skilled at identifying synthetic images. The generator can typically comprise a deconvolutional neural network, and the discriminator can comprise a convolutional neural network. In other words, preferably, both the generator and the discriminator are implemented as neural networks, wherein in particular the generator comprises a deconvolutional network and the discriminator comprises a convolutional network, and/or backpropagation is applied to both the generator and the discriminator.

Regarding the deep learning algorithm, it preferably is or comprises a deep convolutional neural network (DCNN) and is, of course, not part of the GAN itself (external to the GAN). The deep learning algorithm generally uses input data to determine output information, wherein the input data comprises image data, in particular medical image data of a subject patient (subject patient image data). The output information may comprise assistive diagnostic information for supporting a diagnosis to be made by a healthcare professional. For example, in the case of tumor lesion characterization, the output information may be a classification of a tumor lesion shown in the subject patient image data, in particular benign/malignant, and/or a survival estimate and/or other assistive information. That is, the deep learning algorithm may be an algorithm for computer aided/ assisted diagnosis (CAD). The output information, thus, may only serve as a decision support and not be a diagnosis itself.

In particular, the GAN produces synthetic medical image data to be used as training data for training the deep learning algorithm. Such image data, also relating to the known dataset used for training the discriminator, may be associated with a medical imaging modality, for example magnetic resonance imaging, ultrasound imaging and/or x-ray. Preferably, the image data used and synthesized is associated with x-ray imaging, in particular computed tomography (CT).

In summary, at least one embodiment of the invention provides training data synthetization, preferably augmentation, using semi-synthetic image data: For training with few data, we propose Generative Adversarial Networks (GANs) to systematically create synthetic data based, in particular, on semi-supervised learning. A GAN generally includes two parts: A) a generator, creating synthetic images from a specified amount of random numbers, B) a discriminator, determining whether an image is original or synthetic. In a null-sum-game the GAN is trained to create realistic images by its generator part. Combined with a pre-trained, even weak neural network in a bootstrapping process, the network is used to determine the realism of the GAN-generated synthetic data to subsequently improve the synthetic data quality. After training the GAN, the generator is used to create additional, realistic, synthetic training data, not contained in the original dataset (known dataset) resulting in a realistic enrichment of the data pool. In preferred embodiments, therefore, a known dataset used as training data for the discriminator is enriched by the synthetic image data, wherein a combination of data from the known dataset and the synthetic image data forms the training data for the deep learning algorithm.

It may also be provided that the deep learning algorithm is or comprises a classifier sub-algorithm outputting, as output information, a classification by associating at least one final target classification level to input data, and multiple Generative Adversarial Networks are trained and used, one for each final target classification level. For example, different GANs may be trained for benign and malignant tumor lesions to further improve the quality of the generated synthetic image data by focussing on a certain class of input data and the variability of the properties of this class in the image.

When multiple GANs are trained, one per final target classification label (e.g. two GANs for benign/malignant nodule creation), the training set is augmented with synthetic but realistic data. This technique allows to prevent the often occurring problem that a network does not generalize when the ratio of free parameters to available data sets is too large. Our realistic synthetic data enrichment based on Auto-discriminative tumor lesion Characterization using Deep Learning (ACDL) also allows increasing the complexity, i.e. the amount of free parameters, of the network, resulting in a superior classification performance.

At least one embodiment of the current invention, in summary, allows deep learning with few data through realistic training data augmentation. Although different image based augmentation techniques exist to improve performance on smaller pools of data (e.g. affine image transforms), the semantic of the resulting images with respect to the classification goal remains unsure. Affine image transforms may highly interfere with biological information and therefore destroy diagnostically relevant image information, resulting in an unrealistic dataset augmentation and a significantly lower generalization performance. Using realistic, semi-synthetic data generated with GANs allows semantic data augmentation and therefore enables automatic disease classification through deep learning effectively with very few data. This constitutes a competitive advantage, as state-of-the-art computer aided diagnosis often employs several hundreds to thousands of images, often collected over multiple studies with various study designs, for training machine learning algorithms. In contrast, the inventive method using GANs to create synthetic image data reaches equal or superior performance while preserving the specific study environment requiring only a fraction of the data.

The GAN, in particular at least its discriminator, can, for example, be trained with training data comprising image data obtained from patient image data. This can be image data from a subject patient whose tumor lesions are to be characterized. It can also be image data from other patients.

Preferably, as already explained, a known dataset used as training data for the discriminator is enriched by the synthetic image data, wherein a combination of data from the known dataset and the synthetic image data forms the training data for the deep learning algorithm. The invention thus allows augmentation of smaller training data sets, in particular medical patient image data, by adding synthetic image data generated by the GAN.

As will be discussed in more detail in the following, it is generally preferred in the current invention to use a deep learning algorithm comprising an autoencoder sub-algorithm to generate a sparse representation of input data, in particular subject patient image data, followed by the application of a classifier sub-algorithm to derive the output information from the sparse representation. In other words, the deep learning algorithm may comprise a first set of layers acting as an autoencoder and a second set of layers acting as a classifier.

In such an environment, it may be expedient to use feedback from training the autoencoder sub-algorithm in further training of the GAN to further improve the quality of the output data of both these instances. That is, it is conceivable to, when a sparse representation of image data is used in the deep learning algorithm, use feedback from training an autoencoder sub-algorithm generating the sparse representation for training the Generative Adversarial Network.

In a second embodiment, the invention also concerns a method for training a deep learning algorithm to perform a tumor lesion characterization, in particular a lung nodule characterization or for characterization and/or tumor biology visualization and assessment of colorectal cancer, on image data of a region of the anatomy of a subject patient, comprising the step of training the deep learning algorithm with training data comprising synthetic image data. In particular, the synthetic image data as training data was generated in a method according to the first embodiment of the invention. Preferably, the training data also comprises image data obtained from patient image data. In this manner, a small amount of available training data in the form of acquired image data can be enriched/augmented by realistic synthetic data, resulting in a better training and higher quality of output information.

All features and remarks regarding the method to generate synthetic training data also apply here. In particular, the deep learning algorithm may use input data, comprising subject patient image data containing the tumor lesion, to derive output information as described above. Using training data also comprising synthetic image data, in particular synthetic samples added to samples having actually acquired image data, augments the basis for training in a system having many free parameters, as is the case in tumor lesion characterization.

In preferred embodiments, the training step further comprises Adaptive Sample Weighting (ASW). The invention may thus provide training efficacy enhancement through sample difficulty adaption with Adaptive Sample Weighting (ASW). Adaptive Sample Weighting is a novel technique for training neural networks with randomized importance sampling. At its core, ASW is a nested process which presents specific samples to a neural network which are particularly chosen to maximize the predictive performance. The difficulty of predicting cases, measured—in terms of neural networks—as their sample loss, gets transformed into a sampling probability which is proportional to the complexity of the prediction task. To handle occurring oscillation effects—as a naive application of this method leads to the loss of network's prior knowledge—the training is additionally stabilized by the iterative transformation of the sampling probability to a logarithmic equal distribution. As will be discussed below, ASW may advantageously be used when training an autoencoder sub-algorithm for generating a sparse representation.

Using ASW, it is possible to have a hard-to-detect disease emphasis for automatic classification tasks. It is possible to emphasize sub-cohorts of training data whose inherent patterns are hard to automatically detect, e.g. by DCCNs, due to underrepresentation. As ASW is a nested in-training process, each detectable class gets equally distributed within the used neural network, no matter how many samples exist to represent it. This in turn leads to superior predictive performance compared to non-adaptively weighted approaches. Implementing ASW as a nested process ensures the network to always learn on the most instructive training data subset.

ASW combined with generation of synthetic training data using GAN(s) advantageously allows "training-on-the-fly": As mentioned, the deep learning algorithm is capable of training with very few data. This enables on-the-fly-training, meaning that our algorithm can be trained immediately with data acquired in the course of visiting a clinical site, provided that data exists in any form of (X,Y)-tuples, representing image data and target output (output information). Training with few data is enabled by a) semi-synthetic data generation, and b) training efficacy enhancement through sample difficulty adaption.

In especially preferred embodiments, the deep learning algorithm comprises an autoencoder sub-algorithm applied in a first stage to yield a sparse representation of the image data, in particular the image data of the tumor lesion, and a classifier sub-algorithm determining an output information from the sparse representation, in particular associating a final target classification level with the sparse representation. In the case of neural networks, the deep learning algorithm thus comprises a first set of layers acting as an autoencoder and a second set of layers acting as a classifier to derive the output information from the sparse representation. Preferably, the sparse representation may comprise between 10 and 200 parameters, preferably 15 to 25, for example 20, parameters. Using an autoencoder is, again, very advantageous when having few training data, but many free parameters, which may lead to "overfitting" when training the deep learning algorithm. However, by pretraining an autoencoder, as further discussed below, in particular having very few neurons, a bottleneck is formed within the network, enforcing a very general dimensionality reduction.

Sparse factor representation, for example, allows differential diagnosis. Sparse representations allow to differentiate a variety of diseases, as they cover the whole variability of tumor images contained in the training data in only a few values. These sparse representations further allow to be used for a wide range of classification tasks, for example in multi-target characterization.

Embedding, for example, nodule appearance in a sparse representation as presented above does not only allow to predict one specific target, but furthermore enables the full coverage of all lesions' variability contained in training data. This allows to predict a variety of target variables (e.g. tumor malignancy, expected growth, probability for lymph node involvement or metastases, progression free survival, overall survival, . . . ) utilizing the same underlying factor representation. In addition, having a known target variable as output information, the proposed system can be used to improve this sparse characterization to be more specific, leading to a significantly enhanced classification performance.

When utilizing sparse factor representations for giving an early assessment, an estimate on future tumor growth with an AUC of 0.814, compared to 0.698 with RECIST, is allowed. In the example of using sparse factor representation for liver lesions with deep convolutional autoencoders and utilizing the Adaptive Sample Weight (ASW) proposed herein, it is possible to create sparse semantic representations of liver lesions and their respective growth pattern. Therefore, when having at least two time points, the baseline and one follow-up image are given as input to our system, which in turn provides a sparse factor representation. This sparse factor representation can then be utilized for future estimates. Furthermore, our system is able to cope with baseline images only while reaching comparable performance. The sparse factor representation remains quite general, thus it may be not target specific (that is, not output information-specific) and allows the further prediction of a multitude of target variables as output information.

As explained, the classifier sub-algorithm uses the sparse representation to generate output information. This, for example, allows fully-automatic lesion growth prediction. The sparse factor representation serves as an input to a second stage. This second stage is responsible for the target specific estimation. Generally, this second stage is exchangeable and thus can be used to predict a multitude of target variables. Also the second stage can serve as a target specific guide for the first stage, thus further enhancing the sparse factor representation to reach higher target-specific specificity and sensitivity. Our first prototypical implementation performed significantly better than RECIST in predicting future tumor growth. In our analysis we also showed that estimates provided using fully-volumetric tumor-assessment were not more accurate than RECIST-based predictions, thus our system also outperforms volumetric assessment. This is in particular interesting, as our system only requires a single slice of a liver lesion for assessment, while volumetric assessment requires a fully-volumetric segmentation of lesions.

Another example is automatic prediction of one-year-survival rates. A first prototype of the deep learning algorithm was able to predict one-year-survival better than RECIST-based assessment alone. While these results are not final, they show that the system is capable of predicting multiple target variables using the same sparse factor representation.

As already indicated, in a preferred embodiment, the training step comprises
training the autoencoder sub-algorithm comprising reconstructing image data from the sparse representation by a reconstruction sub-algorithm and comparing the reconstructed image data to the training data the sparse representation relates to,
replacing the reconstruction sub-algorithm by the classifier sub-algorithm and training of the deep learning algorithm using the training data.

That is, in a preferred embodiment, the autoencoder sub-algorithm may be pre-trained, in this manner preferably creating a "bottleneck" and forcing a dimensionality reduction, as already explained above. Accordingly, training may take place in two sub-steps. First, the autoencoder is trained to create sparse representations, second, (at least) the classifier appended to the autoencoder sparse representation layer is trained. In an example, the network architecture of the autoencoder sub-algorithm may comprise six to eight layers, to which, for the first training substep, another six to eight layers may be added as a reconstruction sub-algorithm.

In other words, the autoencoder sub-algorithm performs a convolution yielding the sparse representation, while the reconstruction sub-algorithm deconvolutes this sparse representation and yields reconstructed image data, which can be compared to the original training data of the sample from which the sparse representation was derived. In the second sub-step, the layers of the reconstruction sub-algorithm are removed and replaced by layers of a classifier sub-algorithm, which, for example, may comprise two new neural layers. The deep learning algorithm completed in this manner is then trained using the training data, wherein, in a first embodiment, it is possible to keep the autoencoder layers fixed. In other embodiments, however, it may also be advantageous to use training results of the classifier sub-algorithm in a further training of the autoencoder sub-algorithm, in particular for modifying the choice of parameters of the sparse representation. In other words, the choice of parameters in the sparse representation can be optimised regarding a specific output information, while, in other embodiments, it may also be possible to keep these layers of the autoencoder sub-algorithm fixed.

In an especially preferred embodiment, adaptive sample weighing is used to adapt weights depending on comparison results of comparing the reconstructed image data to the training data for each sample of the training data. For example, the sampling probability may be multiplied with the norm of the error gradient for each sample, as huge benefits in training and test set performance are encountered.

In many cases, for example in the already discussed case of classification, the data distribution may be highly imbalanced regarding the different classifications. Using ASW, training may focus on underrepresented cases/final classification levels, equalising the distribution. In other words, training may be focussed on samples which are rare and thus erroneously handled by the autoencoder sub-algorithm.

In an embodiment, multiple, exchangeable classifier sub-algorithms determining different output information are used, wherein in particular the autoencoder sub-algorithm is kept fixed independent of any output information. In particular in a case where the autoencoder sub-algorithm is not changed depending on the output information to be determined, that is, a none-output-information-specific autoencoder sub-algorithm is used, multiple, exchangeable classifier sub-algorithms may be used to determine different output information from the same sparse representation. In other words, the sparse representation can prospectively be used to predict a variety of target variables, that is, output information. In experiments regarding liver lesions due to colorectal cancer, first experiments showed prediction of one-year-survival to be superior to RECIST.

It should be noted at this point that dividing the deep learning algorithm into an autoencoder sub-algorithm and a classifier sub-algorithm and training these two in separate sub-steps is also advantageous independent of using GANs to generate synthetic training data.

An advantageous method for training a deep learning algorithm to perform a tumor lesion characterisation, comprising the step of training the deep learning algorithm with training data, wherein the deep learning algorithm comprises an autoencoder sub-algorithm applied in a first stage to yield a sparse representation of the image data, in particular the image data of the tumor lesion, and a classifier sub-algorithm determining an output information from the sparse representation, in particular associating a final target classification level with the sparse representation, is conceivable, wherein the training step comprises training the autoencoder sub-algorithm comprising reconstructing image data from the sparse representation by a reconstruction sub-algorithm and comparing the reconstructed image data to the training data the sparse representation relates to, replacing the reconstruction sub-algorithm by the classifier sub-algorithm and training of the deep learning algorithm using the training data.

Of course, all features and remarks relating to the use of a pre-trained autoencoder also apply to this conceivable method.

In a further advantageous embodiment of the method according to the second embodiment of the invention, at least a part of the training data samples of the training data comprises additional non-image input data additionally used for training. In particular, such additional non-image input data may comprise tumor biology information and/or tumor therapy information and/or laboratory values and/or subject patient demographics information. In this way, additional information which may or may not be available may be used to further compensate for only having a few samples in the training data.

This can also be termed "multiple-input data fusion". The proposed method is capable of extracting information from a variety of input data sources. It can, for example, thus integrate information from:

a) Input Images

The system can use 1 to n timepoints of CT imaging data for prediction.

b) Tumor Biology

The system can take additional input, such as location, genetics, e.g. K-RAS, N-RAS, B-RAF, and histology.

c) Tumor Therapy

The deep learning algorithm can be trained for particularly classifying lesions under specific therapies. Furthermore, it can handle the therapy itself as an input parameter.

d) Laboratory Values

Laboratory values can serve as an additional input. They thus improve the classification performance additionally.

e) Patient Demographics

Additionally, the algorithm can work with demographic information, such as age and gender of the patient.

In a third embodiment, the invention relates to a method for tumor lesion characterization, in particular for lung nodule characterization or for characterization and/or tumor biology visualization and assessment of colorectal cancer, comprising the steps of:

receiving subject patient image data of a region of the anatomy of subject patient, analysing the subject patient image data using a trained deep learning algorithm, determining an output information regarding a tumor lesion based on the step of analysing, wherein the trained deep learning algorithm has been trained with training data comprising synthetic image data in accordance with a method according to the second embodiment of the invention.

The invention, in this third embodiment, further relates to a system for tumor lesion characterization, comprising an interface to receive subject patient image data of a region of the anatomy of subject patient, an analysing unit for analysing the subject patient image data using a trained deep learning algorithm, wherein the trained deep learning algorithm has been trained with training data comprising synthetic image data in accordance with any of the methods according to the second embodiment of the invention, a determining unit for determining an output information regarding a tumor lesion based on the step of analysing, an interface for outputting the determined output information.

The system may be implemented on a computer, a workstation, in a network of computers or the like. It can be provided as part of an imaging scanner and can be integrated into the scanner's control system. It can also be implemented in a cloud-based solution.

All remarks and features discussed relating to the first and second embodiments may also be applied to the method and system of the first embodiment. That is, the third embodiment relates to the application of the trained deep learning algorithm to obtain output information regarding the tumor lesion.

The output information regarding a tumor lesion can be a target variable output of the deep learning algorithm. In particular, the output information regarding a tumor lesion can be a classification information of the tumor lesion or of a patient disease state (e.g. benign/malignant, tumor stage classification, treatment susceptibility, etc.) or a quantitative parameter (e.g. predicted overall survival rate, five year survival rate, etc.), as already discussed above. Output information regarding a lung nodule may also be a classification information of the lung nodule (e.g. benign/malignant, tumor stage classification, treatment susceptibility, etc.) or a quantitative parameter (e.g. predicted overall survival rate, etc.).

In the application of lung nodule characterization, an Auto-discriminative nodule Characterization using Deep Learning (ACDL) results. Nodule characterization is a crucial task, as it guides further treatment steps as well as differential diagnosis. As deep learning determines discriminative features without the need for hand-crafted design or specification, it can perform significantly better than classical approaches, assuming the data pool used to train the deep learning algorithm, in particular a DCCN, to be large enough. The system preferably employs a combination of augmentation techniques, training improvements and deep convolutional sparse autoencoders (as explained above) to efficiently reduce the needed data pool size to only few samples with great generalization performance.

In particular, early assessment via small-nodule-characterization may be enabled. The proposed approach can be used to characterize smaller lesions with <10 mm in diameter, when usually no biopsy is done because of interventional risks. Thus, the method and system according to the third embodiment allow giving an early assessment, resulting in better survival chances, as therapy could be initiated in an early tumor stage. As, to the best of our knowledge, there is currently no solution assessing small lung lesions, this in turn results in a competitive advantage.

In general tumor lesion characterization, or in particular when assessing liver lesions due to colorectal cancer, early assessment with lesion growth estimate is possible. Using the proposed deep learning algorithm and system it is possible to give an early assessment of future lesion growth. Thus, the system allows early therapy adaption with practical implications for patient treatment and therefore possibly patient survival.

Of course, other advantages already discussed also apply.

In a preferred embodiment of the method (and system) according to the third embodiment, an output information-specific visualization information regarding input regions predictive for specific outcome estimates is determined and the visualization information is output with the output information. To achieve this, guided backpropagation from the output space of the output information to the input space of the subject patient image data may be used. In other words, a so-called saliency map may be determined and used to visualize the reasoning for the decisions of the deep learning algorithm. More information on saliency maps may, for example, be taken from the following articles:

Karen Simonyan et a. (2013). Deep Inside Convolutional Networks: Visualising Image Classification Models and Saliency Maps. arXiv preprint arXiv:1312.6034, the entire contents of which are hereby incorporated herein by reference.

Springenberg, J. T. et al. (2015). Striving for Simplicity: The All Convolutional Net. arXiv preprint arXiv: 1412.6806, the entire contents of which are hereby incorporated herein by reference.

It is noted that this embodiment is also advantageous independently from using synthetic training data. Thus, a method and system dor tumor lesion characterization and visualization are conceivable. The method would comprise the following steps:

receiving subject patient image data of a region of the anatomy of subject patient, analysing the subject patient image data using a trained deep learning algorithm, determining an output information regarding a tumor lesion based on the step of analysing, determining an output information-specific visualization information regarding input regions predictive for specific outcome estimates, and outputting the visualization information with the output information.

A system, of this embodiment, would comprise:

an interface to receive subject patient image data of a region of the anatomy of subject patient, an analysing unit for analysing the subject patient image data using a trained deep learning algorithm, a determining unit for determining an output information regarding a tumor lesion based on the step of analysing and an output information-specific visualization information regarding input regions predictive for specific outcome estimates, an interface for outputting the determined output information and visualization information.

Of course, a combination of using synthetic image data as training data and/or using a sparse representation, in particular applying ASW, with this visualization approach provides additional synergetic advantages, such that all remarks relating to these embodiments may still be applied to such a method or system. Generally, the embodiment of visualization will be explained in the following in more detail.

A major difficulty when using deep learning for medical image classification arises from the non-interpretability. Neural networks alone are intangible, intransparent and incomprehensible. This applies particularly for end users without deeper technical knowledge, but nevertheless stays true for computer scientists with a well-substantiated knowledge base in machine learning and neural networks, as neural networks apply an intuitively nearly unmanageable amount of nonlinear functions and embeddings. Therefore, it is advantageous to visualize which factors/image regions are responsible for the network's prediction. Thus, a visualisation of indicative regions, for example based on the algorithm by Simonyan (2013) is proposed. The visualization may be created using guided backpropagation of the network activation from the output layer back to the network's input. This allows to visualize regions which are indicative for specific output information, e.g. tumor growth.

In other words, assessment reasoning, in particular also via multi-target saliency maps, may be provided, which is particularly advantageous in a healthcare environment. Understandably, practitioners in healthcare are reserved with fully-automatic estimates on future progresses of disease. It is therefore of high clinical, as well as of high business-value to reason why an algorithm chooses a specific estimate. A novel visualization component based on saliency maps is proposed, which enables target-specific visualization of input regions predictive for specific outcome estimates, e.g. future lesion growth or one-year-survival. This is done via guided propagation from output to input space. Using this approach, it is also possible to visualize combinations, as well as their differences. Thus, the method and system allow the data-driven identification of very specific characteristics in the input region, like image structures and laboratory values (if using additional input data), which, e.g., are predictive for lesion growth but are not predictive for patient survival. For input space visualization, a heat-map-based overlay on the original tumor image is proposed, indicating decision-relevant input regions.

With saliency map visualization, the method and system are capable of reasoning why it decides to estimate, for example, growth or non-growth. It does so by visualizing decision-relevant input regions in form of a heat-map overlay on the original image. The reasoning mechanism can be applied to a multitude of input variables and is not specific to images but can also be applied to additional input data/information, e.g. clinical or demographic data.

Figure 1:
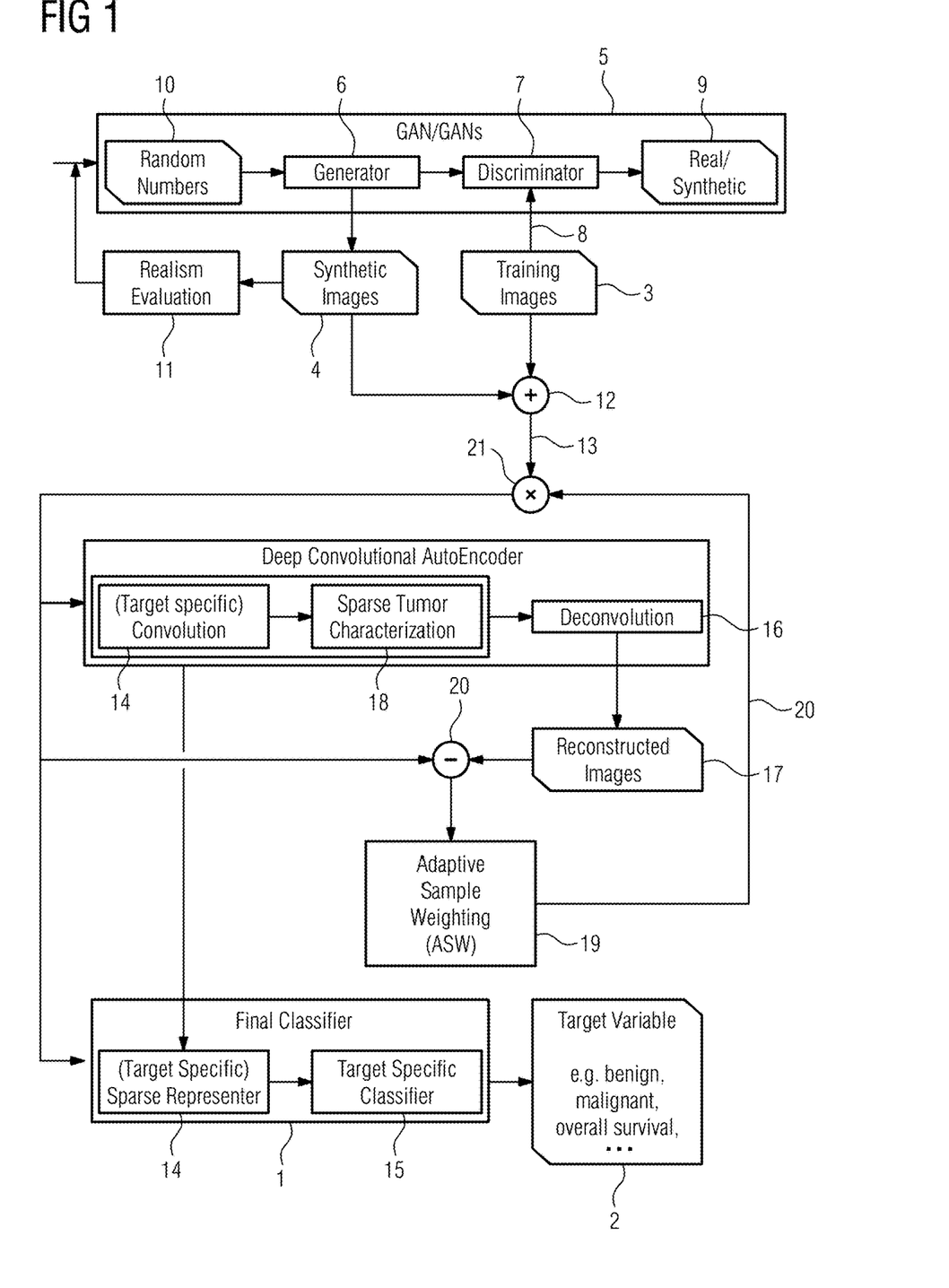
FIG. 1 is a schematic drawing depicting the methods and system of an embodiment of the invention.

FIG. 1 is a schematic drawing allowing to explain the methods and systems of an embodiment of the current invention. The object of the method and systems explained below is to train and finally use a deep learning algorithm 1 to derive output information 2 (target variables) from input data comprising subject patient image data showing at least one tumor lesion in an area of the anatomy of the subject patient. The output information 2 describes the tumor lesion and/or its implications, for example a classification of the tumor lesion to be characterized by the deep learning algorithm 1, in particular if it is benign or malignant, or probabilities therefore, respectively. Another example of output information 2 is a classification level or value describing the expected survival of the subject patient.

While it can generally be the that the deep learning algorithm 1 can be trained to characterize various different tumor lesions, an embodiment of the current invention can be especially advantageously applied to lung nodules and/or liver lesions, in particular in conjunction with colorectal cancer, as tumor lesions.

In such medical scenarios, the amount of actually acquired patient image data 3, from which image data as training data for the deep learning algorithm may be derived, is very small, in particular in comparison with the number of free parameters in the deep learning algorithm 1, which, in these embodiments, may in particular be a deep convolution neural network (DCNN).

Due to the sparsity of actually acquired patient image data 3 as training data, the method according to the first embodiment of the invention concerns augmentation of the training data, i.e. adding synthetic image data 4 to the already available image data taken from patient image data 3 (known dataset), wherein it is noted that the patient image data 3 may have been taken from the subject patient, but may also have been acquired from other patients. In the principle application cases discussed above—lung nodules and liver lesions in conjunction with colorectal cancer —, the patient image data 3 may in particular be CT image data, meaning that synthetic image data 4 to be added to the training data should also be associated with CT imaging, in particular look like CT images.

To synthesize a synthetic image data 4, a Generative Adversarial Network (GAN) 5 is used, where it is preferable to use multiple GANs 5 if different classifications (final classification levels) may result as output information 2, such that one GAN 5 is used for each classification, for example benign and malignant.

As is in principle known from the state of the art, a GAN 5 comprises a generator 6 and a discriminator 7, in this case both implemented as neural networks. While the generator comprises a deconvolutional network, a discriminator comprises a convolutional network. The discriminator 7, according to arrow 8, is trained by using the real patient image data 3 such that it may decide whether an image provided is real or synthetic, see decision data 9 in FIG. 1. In a "null-sum game", the generator 6 now tries to "fool" the discriminator 7 by creating synthetic images based on random numbers 10. In particular, backpropagation is applied to both the generator 6 and the discriminator 7. For synthetic image data 4, a realism evaluation 11 is applied based on the decision data 9.

Once the GAN 5 has been sufficiently trained, it may generate synthetic image data 4 to be added to the patient image data 3, see step 12, to obtain training data to be altogether used for training the deep learning algorithm 1 in a method according to the second embodiment of the invention.

Figure 2:
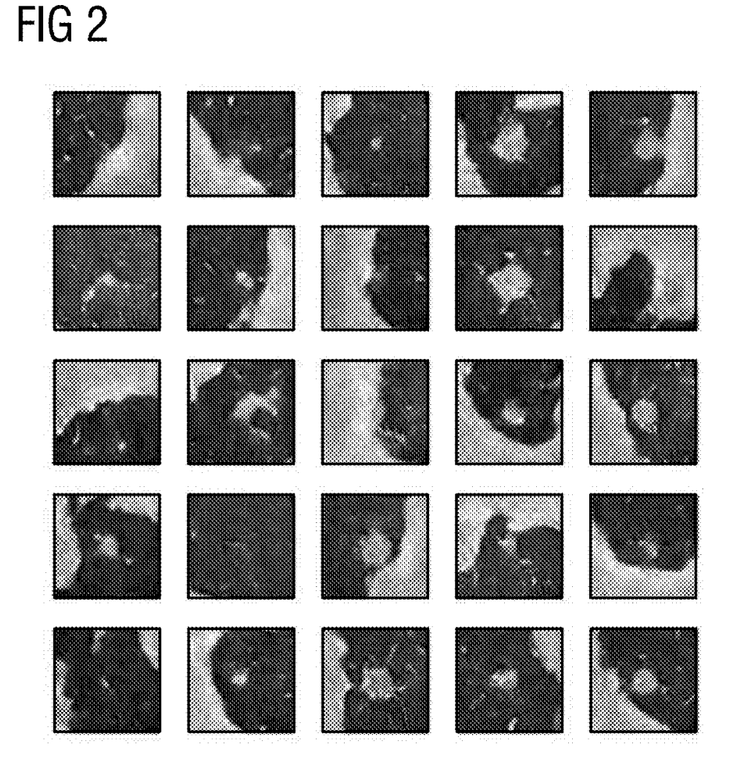
FIG. 2 shows synthetic image data created by a method of an embodiment of the invention which can be used as synthetic training data in further methods of an embodiment of the invention.

Examples for synthetic image data 4 created by a method according to the first embodiment of the invention are shown in FIG. 2 for the example of lung nodules.

Returning to FIG. 1, a method according to the second embodiment of the invention, that is, for training the deep learning algorithm 1, is illustrated in the lower part of FIG. 1. The training data being a combination of image data from the patient image data 3 and synthetic image data 4 is used, according to arrow 13. It is noted that usually the training data comprises samples, wherein each sample comprises input data for the deep learning algorithm 1 as well as the ground truth information, in particular relating to or being known output information 2. In the embodiments described here, the input data may not only comprise subject patient image data, but also additional non-image input data, for example tumor biology information, tumor therapy information, laboratory values and/or subject patient demographics information.

As can be seen in FIG. 1, the deep learning algorithm 1 comprises two sub-algorithms, namely an autoencoder sub-algorithm 14 and a classifier sub-algorithm 15, each in particular comprising multiple layers of the deep convolutional neural network. The autoencoder sub-algorithm 14 creates a sparse representation 18 of the input data by convolution, in this manner creating a "bottleneck", essentially reducing the dimensionality of the problem. In this example, the sparse representation 18 comprises twenty parameters.

This sparse representation 18 may or may not be target-specific, that is, output information specific, as explained above.

In any case, training of the deep learning algorithm 1 takes place in two sub-steps. In a first sub-step, the autoencoder sub-algorithm 14 is pre-trained, that is, the layers of the classifier sub-algorithm 15 are removed and replaced by a reconstruction sub-algorithm 16 which creates reconstructed image data 17 from sparse representations 18 determined by the autoencoder sub-algorithm 14. The training in this first sub-step is not specific for the output information 2. However, since the training data usually is not equally distributed over, for example, multiple possible classifications, Adaptive Sample Weighting (ASW) 19 is employed regarding the comparison of reconstructed image data 17 and the original image data of the sample used to create the respective sparse representation 18, wherein the comparison is indicated by step 20 in FIG. 1. Using ASW, where cases which lead to sparsification errors can be emphasised by adjusting the sampling probability, see arrow 20 and step 21.

Once the autoencoder sub-algorithm 14 has been pre-trained, the deconvolutional layers of the reconstruction sub-algorithm 16 are removed and the layers of the output information-specific classifier sub-algorithm 15 are added to create the full deep learning algorithm 1. Note that, since the sparse representation 18 is not (yet) output information-specific, multiple classifier sub-algorithms 15 may be used providing different output information 2. It is, however, noted that results of the now following second sub-step may, in embodiments, of course also be used to adapt the sparse representation 18 to specific output information 2.

In any case, in the second sub-step of the training step, the deep learning algorithm 1 itself is now trained according to the training data.

After adequate training of the deep learning algorithm 1, it may be used in a method according to the third embodiment of the invention and thus a system according to the third embodiment of the invention, respectively, to provide tumor lesion characterization.

The proposed methods and systems were, for example, tested on lung lesion images and resulted in great performance boosts for lung lesion malignancy classification compared to Radiomics or comparable deep learning approaches. The methods and systems reach results easily comparable to the state of the art with much simpler network architecture and/or less training samples, both resulting in advantages when used for fewer-case-studies in clinical applications. First experiments also show transferability of the same methods to different application tasks.

Figure 3:
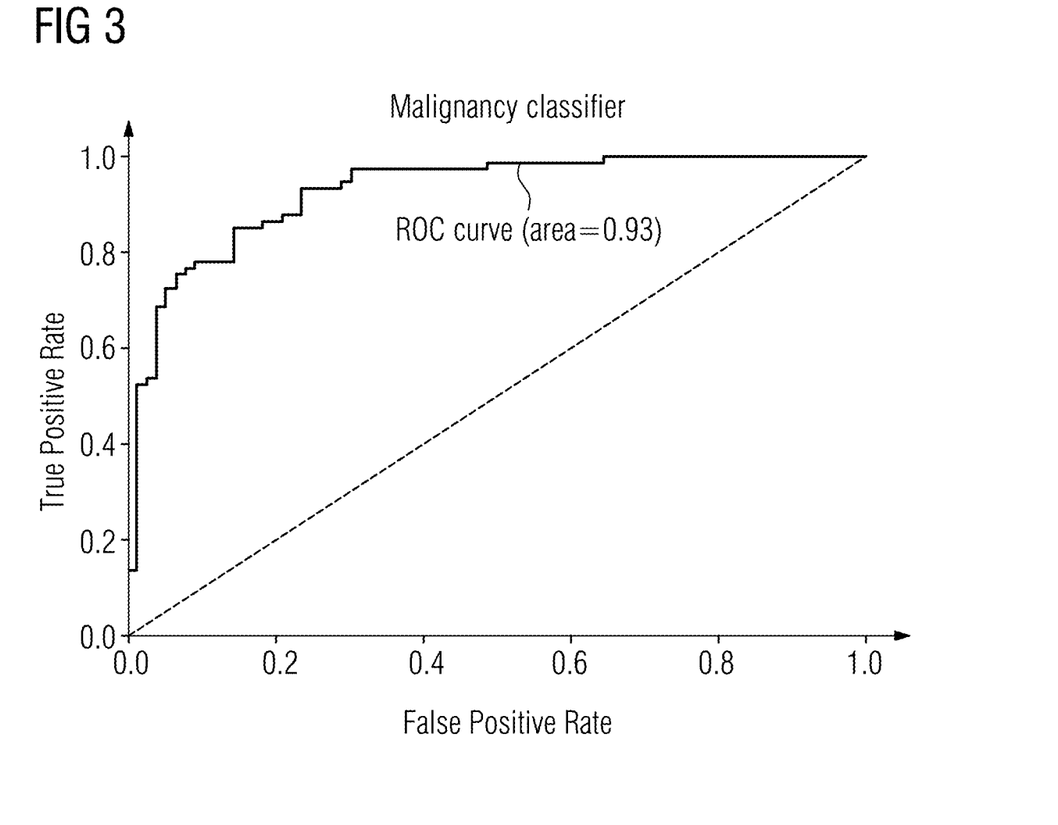
FIG. 3 is a receiver-operating characteristic for lung lesion malignancy classification with the proposed system.

FIG. 3 shows a Receiver-Operating-Characteristic (ROC) for lung lesion malignancy classification with a system according to the invention. The x-axis shows the false positive rate/1—specifity, the y-axis shows a true positive rate/sensitivity. As can be seen, superb classification performance can be achieved.

An embodiment of the current invention further allows to calculate saliency maps providing a reasoning for the decisions of the deep learning algorithm 1. For example, an adapted algorithm as proposed by K. Simonyan in the above-cited paper may be used.

Figure 4:
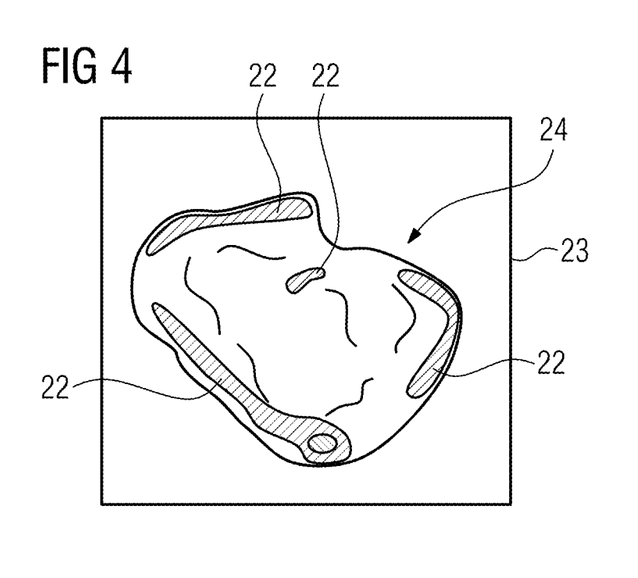
FIG. 4 shows an example of a visualization of a saliency map.

FIG. 4 shows an example for such an output information-specific visualization regarding input regions 22 predictive for specific outcome estimates in a heat-map like overlay, such that an overlaid image 23 showing both the segmented tumor lesion 24 and the image regions 22 by respective coloring is provided.

In the example of FIG. 4, a single-slice segmented liver lesion is shown as tumor lesion 24 having an overlay visualization of image regions 22 predictive for future tumor growth. As can be seen, future growth is—expectedly—likely due to marginalized contrast agent absorption. However, inner structuring is predictive in this case, too.

Figure 5:
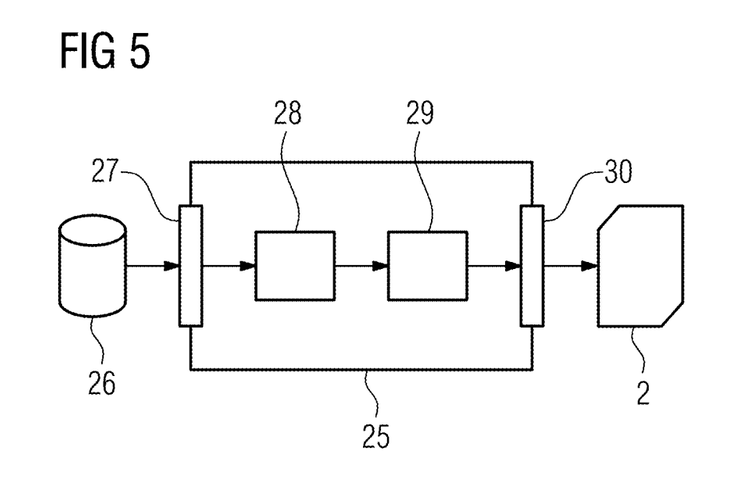
FIG. 5 is a schematic drawing showing a system according to an embodiment of the invention.

FIG. 5 finally shows a schematic drawing of principal components of a system 25 according to an embodiment of the invention.

The system 25 receives subject patient image data 26 via an interface 27. An analyzing unit 28 analyzes the subject patient image data 26 using the deep learning algorithm 1. A determining unit 29 determines the output information 2, which is output using an interface 30.

To the best of our knowledge there is currently no alternative solution combining the advantages described herein. Hand-crafted radiomics features, as described herein, may also be usable for multiple targets. However, with hand-crafted features only a subset is used for the classification. As the concrete choice on the used subset highly depends on the classification task, this prevents the use as a general lesion characterization. Furthermore, with hand-crafted features no feasible generalization performance can be expected, as they are highly prone to variation through scanner parameters or irrelevant biological interference.

Especially there exists no system providing an early assessment for liver lesions on future growth or survival, whether using or not using a sparse characterization. Radiomics can be seen as an alternative technical solution for the problem, but in our experiments they did not perform better than RECIST or volume and, thus, show no inventive benefits. Our system, however, performed significantly better than RECIST or volume based assessment.

Although the present invention has been described in detail with reference to the preferred embodiment, the present invention is not limited by the disclosed examples from which the skilled person is able to derive other variations without departing from the scope of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claim is:

1. A method for generating synthetic training data for training a deep learning algorithm, comprising:
    training a Generative Adversarial Network to generate synthetic image data, the Generative Adversarial Network including a generator and a discriminator; and
    using the generator of the Generative Adversarial Network to generate synthetic image data as the synthetic training data, wherein a sparse representation of image data is used in the deep learning algorithm, and wherein feedback from training an autoencoder sub-algorithm generating the sparse representation is used for training the Generative Adversarial Network.

2. The method of claim 1, wherein both the generator and the discriminator are implemented as neural networks.

3. The method of claim 2, wherein the generator is a deconvolutional network and the discriminator includes a convolutional network.

4. The method of claim 3, wherein backpropagation is applied to both the generator and the discriminator.

5. The method of claim 2, wherein backpropagation is applied to both the generator and the discriminator.

6. The method of claim 2, wherein the Generative Adversarial Network is trained with training data including image data obtained from patient image data of at least one of a subject patient and other patients.

7. The method of claim 2, wherein a known dataset, usable as training data for the discriminator, is enriched by the synthetic image data, and wherein a combination of da-ta from the known dataset and the synthetic image data forms the synthetic training data for the deep learning algorithm.

8. The method of claim 1, wherein the Generative Adversarial Network is trained with training data including image data obtained from patient image data of at least one of a subject patient and other patients.

9. The method of claim 8, wherein a known dataset, usable as training data for the discriminator, is enriched by the synthetic image data, and wherein a combination of data from the known dataset and the synthetic image data forms the synthetic training data for the deep learning algorithm.

10. The method of claim 1, wherein a known dataset, usable as training data for the discriminator, is enriched by the synthetic image data, and wherein a combination of data from the known dataset and the synthetic image data forms the synthetic training data for the deep learning algorithm.

11. The method of claim 1, wherein the deep learning algorithm is or includes a classifier sub-algorithm outputting, as output information, a classification by associating at least one final target classification level to input data and wherein multiple Generative Adversarial Networks are trained and used, one for each final target classification level.

12. A non-transitory computer readable medium, storing a computer program to perform the method of claim 1 when the computer program is executed on a computer.

13. A non-transitory electronically readable storage medium, storing a computer program including program code which, upon execution by a computer, is configured to per-form the method of claim 1.

14. A method for training a deep learning algorithm to perform a tumor lesion characterization on image data of a region of an anatomy of a subject patient, comprising:
training the deep learning algorithm with training data including synthetic image data, wherein the deep learning algorithm includes an autoencoder sub-algorithm applied in a first stage to yield a sparse representation of the image data, and a classifier sub-algorithm determining an output information from the sparse representation, and wherein the training further includes:
training the autoencoder sub-algorithm including reconstructing image data from the sparse representation by a reconstruction sub-algorithm and comparing the reconstructed image data to the training data the sparse representation relates to, and
replacing the reconstruction sub-algorithm by the classifier sub-algorithm and training the deep learning algorithm using the training data.

15. The method of claim 14, wherein the training data includes image data obtained from patient image data.

16. The method of claim 15, wherein the synthetic image data, as training data, is generated by at least:
training a Generative Adversarial Network to generate synthetic image data, the Generative Adversarial Network including a generator and a discriminator; and
using the generator of the Generative Adversarial Network to generate synthetic image data as the synthetic training data.

17. The method of claim 14, wherein the training further includes Adaptive Sample Weighting.

18. The method of claim 14, wherein training results of the classifier sub-algorithm are used in a further training of the autoencoder sub-algorithm.

19. The method of claim 14, wherein the training further includes Adaptive Sample Weighting and wherein the Adaptive Sample Weighting is used to adapt weights depending on comparison results of comparing the reconstructed image data to the training data for each sample of the training data.

20. The method of claim 19, wherein at least a part of the training data samples of the training data includes additional non-image input data additionally used for training.

21. The method of claim 20, wherein the additional non-image input data comprises at least one of tumor biology information, tumor therapy information, laboratory values and subject patient demographics information.

22. The method of claim 14, wherein multiple, exchangeable classifier sub-algorithms determining different output information are used.

23. The method of claim 14, wherein the tumor lesion characterization is a lung nodule characterization.

24. The method of claim 14, wherein the tumor lesion characterization is for at least one of characterization and tumor biology visualization and assessment of colorectal cancer.

25. The method of claim 14, wherein the synthetic image data, as training data, is generated by at least:
training a Generative Adversarial Network to generate synthetic image data, the Generative Adversarial Network including a generator and a discriminator; and
using the generator of the Generative Adversarial Network to generate synthetic image data as the synthetic training data.

26. The method of claim 25, wherein the training further includes Adaptive Sample Weighting.

27. A non-transitory electronically readable storage medium, storing a computer program including program code which, upon execution by a computer, is configured to perform the method of claim 25.

28. The method of claim 14, wherein the autoencoder sub-algorithm is applied in the first stage to yield a sparse representation of the image data of the tumor lesion, and the classifier sub-algorithm determines an output information from the sparse representation, associating a final target classification level with the sparse representation.

29. The method of claim 14, wherein training results of the classifier sub-algorithm are used in a further training of the autoencoder sub-algorithm, for modifying parameters of the sparse representation.

30. A non-transitory electronically readable storage medium, storing a computer program including program code which, upon execution by a computer, is configured to perform the method of claim 14.

31. A method for tumor lesion characterization, comprising:
receiving subject patient image data of a region of an anatomy of a subject patient;
analysing the subject patient image data received using a trained deep learning algorithm; and
determining an output information regarding a tumor lesion based on the analysing,
wherein the trained deep learning algorithm has been trained with training data including synthetic image data,
wherein the deep learning algorithm includes an autoencoder sub-algorithm applied in a first stage to yield a sparse representation of the image data, and a classifier sub-algorithm determining an output information from the sparse representation, and wherein the training further includes:

training the autoencoder sub-algorithm including reconstructing image data from the sparse representation by a reconstruction sub-algorithm and comparing the reconstructed image data to the training data the sparse representation relates to, and replacing the reconstruction sub-algorithm by the classifier sub-algorithm and training the deep learning algorithm using the training data.

32. The method of claim 31, wherein an output information-specific visualization information regarding input regions predictive for specific outcome estimates is determined and the visualization information is output with the output information.

33. The method of claim 21, wherein the synthetic image data, as training data, is generated by at least:

training a Generative Adversarial Network to generate synthetic image data, the Generative Adversarial Network including a generator and a discriminator; and using the generator of the Generative Adversarial Network to generate synthetic image data as the synthetic training data.

34. A non-transitory electronically readable storage medium, storing a computer program including program code which, upon execution by a computer, is configured to perform the method of claim 31.

35. A system for tumor lesion characterization, comprising:

an interface to receive subject patient image data of a region of an anatomy of a subject patient;

an analysing unit to analyse the subject patient image data received using a trained deep learning algorithm, wherein the trained deep learning algorithm has been trained with training data including synthetic image data;

a determining unit to determine output information regarding a tumor lesion based on analysis of the analysing unit; and an interface to output the output information determined, wherein the trained deep learning algorithm has been trained with training data including synthetic image data, wherein the deep learning algorithm includes an autoencoder sub-algorithm applied in a first stage to yield a sparse representation of the image data, and a classifier sub-algorithm determining an output information from the sparse representation, and wherein the training further includes:

training the autoencoder sub-algorithm including reconstructing image data from the sparse representation by a reconstruction sub-algorithm and comparing the reconstructed image data to the training data the sparse representation relates to, and replacing the reconstruction sub-algorithm by the classifier sub-algorithm and training the deep learning algorithm using the training data.

36. The system of claim 35, wherein synthetic image data, as training data, is data previously generated by training a Generative Adversarial Network to generate synthetic image data, the Generative Adversarial Network including a generator and a discriminator; and using the generator of the Generative Adversarial Network to generate synthetic image data as the synthetic training data.

37. A system for tumor lesion characterization, comprising:

an interface to receive subject patient image data of a region of an anatomy of a subject patient;

at least one processor to analyse the subject patient image data received using a trained deep learning algorithm, wherein the trained deep learning algorithm has been trained with training data including synthetic image data, and determine output information regarding a tumor lesion based on the subject patient image data analyzed; and an interface to output the output information determined, wherein the trained deep learning algorithm has been trained with training data including synthetic image data, wherein the deep learning algorithm includes an autoencoder sub-algorithm applied in a first stage to yield a sparse representation of the image data, and a classifier sub-algorithm determining an output information from the sparse representation, and wherein the training further includes:

training the autoencoder sub-algorithm including reconstructing image data from the sparse representation by a reconstruction sub-algorithm and comparing the reconstructed image data to the training data the sparse representation relates to, and replacing the reconstruction sub-algorithm by the classifier sub-algorithm and training the deep learning algorithm using the training data.

38. The system of claim 37, wherein synthetic image data, as training data, is data previously generated by training a Generative Adversarial Network to generate synthetic image data, the Generative Adversarial Network including a generator and a discriminator; and using the generator of the Generative Adversarial Network to generate synthetic image data as the synthetic training data.

* * * * *